US008274361B2

(12) United States Patent
Joosen

(10) Patent No.: US 8,274,361 B2
(45) Date of Patent: Sep. 25, 2012

(54) CONTROL DEVICE FOR SELECTING THE COLOR OF LIGHT EMITTED BY A LIGHT SOURCE

(75) Inventor: Bram François Joosen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1060 days.

(21) Appl. No.: 12/162,096

(22) PCT Filed: Jan. 18, 2007

(86) PCT No.: PCT/IB2007/050169

§ 371 (c)(1), (2), (4) Date: Jul. 24, 2008

(87) PCT Pub. No.: WO2007/085986

PCT Pub. Date: Aug. 2, 2007

(65) Prior Publication Data

US 2009/0135021 A1 May 28, 2009

(30) Foreign Application Priority Data

Jan. 25, 2006 (EP) .................................... 06100853

(51) Int. Cl.

| | |
|---|---|
| ***G05B 19/02*** | (2006.01) |
| ***H05B 1/02*** | (2006.01) |
| ***G09G 5/02*** | (2006.01) |
| ***F21S 8/00*** | (2006.01) |

(52) U.S. Cl. .......... 340/4.3; 219/502; 345/589; 362/268

(58) Field of Classification Search ........................ None
See application file for complete search history.

(56) References Cited

U.S. PATENT DOCUMENTS

| | | | | |
|---|---|---|---|---|
| 4,602,321 | A * | 7/1986 | Bornhorst | 362/268 |
| 5,012,299 | A | 4/1991 | Sawamura et al. | |
| 6,031,543 | A | 2/2000 | Miyashita et al. | |
| 6,888,322 | B2 * | 5/2005 | Dowling et al. | 315/292 |
| 7,228,190 | B2 * | 6/2007 | Dowling et al. | 700/94 |
| 7,667,163 | B2 * | 2/2010 | Ashworth et al. | 219/502 |
| 2002/0003704 | A1 * | 1/2002 | Ohmae et al. | 362/293 |
| 2003/0103057 | A1 * | 6/2003 | Graves et al. | 345/589 |
| 2004/0160199 | A1 | 8/2004 | Morgan et al. | |
| 2005/0040772 | A1 * | 2/2005 | Guzman et al. | 315/291 |

(Continued)

FOREIGN PATENT DOCUMENTS

DE 19942177 A1 3/2001

(Continued)

*Primary Examiner* — George Bugg
*Assistant Examiner* — Renee Dorsey
(74) *Attorney, Agent, or Firm* — Mark L. Beloborodov

(57) ABSTRACT

The invention relates to a control device (1) for controlling hue (H) and saturation (S) of light (L) emitted by a light source (2). The device comprises a body (20) with a surface (21) containing a visible representation (10,11,12,13) of a plurality of selectable combinations of hue and saturation available for said light source. The device further has means (26) for generating at least one selection signal in response to a selection of a combination of hue and saturation on said surface, said selection signal comprising said selected hue and saturation, and means (27) for communicating said selection signal to said light source to control said hue and saturation of said light in accordance with said selected combination of hue and saturation. The control device (1) is simple and user intuitive.

9 Claims, 4 Drawing Sheets

U.S. PATENT DOCUMENTS

| | | | | |
|---|---|---|---|---|
| 2005/0151489 | A1 * | 7/2005 | Lys et al. | 315/308 |
| 2006/0028483 | A1 * | 2/2006 | Kondo et al. | 345/594 |
| 2006/0152172 | A9 * | 7/2006 | Mueller et al. | 315/291 |
| 2007/0152797 | A1 * | 7/2007 | Chemel et al. | 340/2.2 |
| 2009/0174568 | A1 * | 7/2009 | Diederiks et al. | 340/825 |

FOREIGN PATENT DOCUMENTS

| | | | | |
|---|---|---|---|---|
| EP | 453243 | A2 | | 10/1991 |
| EP | 595746 | A1 | | 5/1994 |
| EP | 1587347 | A2 | | 10/2005 |
| JP | 9205658 | A | | 8/1997 |
| WO | 03/015067 | A1 | | 2/2003 |
| WO | 2004/072840 | A1 | | 8/2004 |
| WO | WO 2004072840 | A1 | * | 8/2004 |
| WO | 2005107338 | A | | 11/2005 |
| WO | 2006038135 | A | | 4/2006 |
| WO | 2006054263 | A | | 5/2006 |
| WO | 2006134529 | A | | 12/2006 |

* cited by examiner

CONTROL DEVICE FOR SELECTING THE COLOR OF LIGHT EMITTED BY A LIGHT SOURCE

FIELD OF THE INVENTION

Generally, the invention relates to light sources. More specifically, the invention relates to a control device for selecting the color of light emitted by a light source, in particular the hue and saturation of the light emitted by said light source.

BACKGROUND OF THE INVENTION

Light sources are frequently applied to several types of atmosphere and ambience lighting applications for creating mood in e.g. a living room. More and more, these light sources comprise a plurality of light emitting diodes (LEDs) that may emit different colors. Amongst other types of light sources, light sources employing LEDs allow to control the color of the light emitted by such light sources.

A typical control device comprises buttons to individually control hue, saturation and possibly brightness of the emitted light. However, it has been found that such a control device presents difficulties to users in selecting the desired color of the light emitted by the light source.

Therefore, there is a need to provide a less complex and more intuitive way of controlling the light emitted by a light source.

SUMMARY OF THE INVENTION

It is an object of the invention to provide a control device that allows control of the light emitted by a light source in a less complex and more intuitive way.

The invention provides a control device for controlling hue and saturation of light emitted by a light source. The device comprises a body with a surface containing a visible representation of a plurality of selectable combinations of hue and saturation available for said light source. The device further has means for generating at least one selection signal in response to a selection of a combination of hue and saturation on said surface, wherein said selection signal comprises said selected hue and saturation. Means are provided for communicating said selection signal to said light source to control said hue and saturation of said light in accordance with said selected combination of hue and saturation.

By printing, displaying or otherwise providing at least a portion of a color space (showing the hue dimension and saturation dimension in one representation) on a surface, a user may simply select (e.g. by means of his finger or a selection device) a position or area on said surface corresponding with the combination of hue and saturation. In other words, the hue and saturation of the emitted light can be freely and simultaneously selected on the surface in a single selection action. This selection is determined by the control device and triggers the light source to emit light with a corresponding hue and saturation. Consequently, the control of the light source is simple and intuitive.

One embodiment of the invention offers the advantage of additionally controlling the brightness of the emitted light using the same body as for the selection of the hue and saturation. Consequently, hue, saturation and brightness of the emitted light can all be controlled by manipulating a single body.

Another embodiment of the invention provides a suitable embodiment using proven technology to determine the selected combination of hue and saturation.

Other embodiments of the invention offer the advantage that the selection of the hue and saturation can be made on one side of the spherical body, whereas the determination of this selection is made on the opposite side of the spherical body.

Yet another embodiment of the invention offers the advantage that ambient light does not disturb the optical determination of the selection of hue and saturation.

Still another embodiment of the invention provides a suitable embodiment for integration of the brightness control functionality in the embodiment using a spherical body as the selection means for the desired combination of hue and saturation.

Still another embodiment of the invention provides the visible representation of hue and saturation as a color wheel that has been found to be a user intuitive selection means.

Preferably, the light source comprises a plurality of light emitting diodes (LEDs) of different colors that define a gamut of available colors in the full color space. One embodiment of the invention provides a suitable shape for displaying this gamut.

One embodiment of the invention provides a control device with added brightness control functionality that provides tactile feedback from the selection surface for selecting the desired combination of hue and saturation.

The invention will be further illustrated with reference to the attached drawings, which schematically show preferred embodiments according to the invention. It will be understood that the invention is not in any way restricted to these specific and preferred embodiments.

DETAILED DESCRIPTION OF THE DRAWINGS

Figure 1:
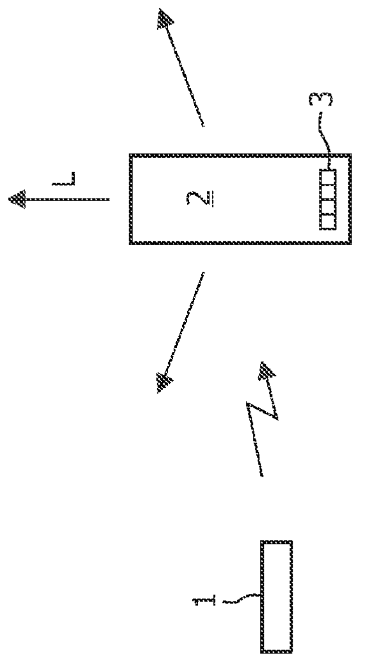
FIG. 1 displays a light source controllable by a control device.

In FIG. 1, a schematic illustration is depicted wherein a control device 1 is employed to control a light source 2 comprising a plurality of light emitting diodes (LEDs) 3 of different colors that allow the light source 2 to emit light L of different colors. Control of the light source 2 by the control device 1 may be performed either in wireless or wired (not shown) fashion.

In particular, the control device 1 according to an embodiment of the invention is arranged to control the color of the light L of the light source 2. The color of the light L is defined as the combination of the hue H and saturation S of the light L, as is well known in the art. The hue H of the light L represents the dominant wavelength, whereas the saturation S of the light L represents the dominance of the hue in the emitted light L; the saturation S is the ratio of the dominant wavelength to all wavelengths within the color of the emitted light. A saturation S of 100% for a particular hue H may represent a 'pure' hue H.

Figure 2A:
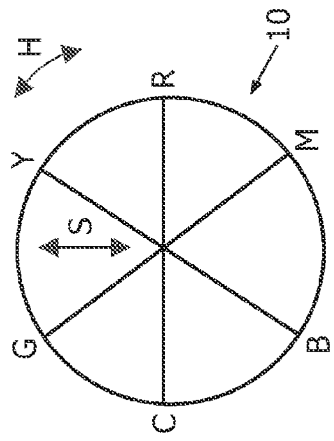
FIGS. 2A-2C depict various representations of a color space.
Figure 2B:
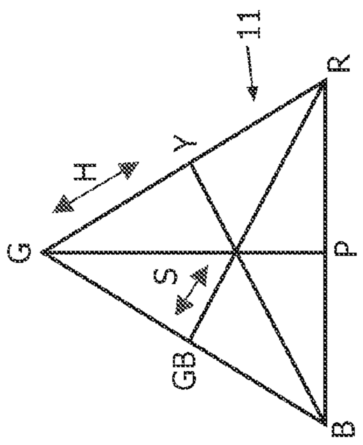
Figure 2C:
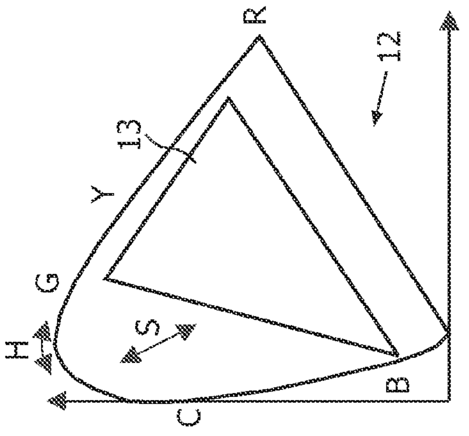

In accordance with an embodiment of the invention, a printed representation of a plurality of combinations of hue and saturation is provided for the control device 1 to enable a user to easily and intuitively select the desired color for the light L of the light source 2. FIGS. 2A-2C show a few examples of such representations, also referred to as color space representations.

In FIG. 2A a color wheel 10 is depicted with the saturated colors green (G), yellow (Y), red (R), magenta (M), blue (B) and cyan (C) around the outer perimeter of the wheel 10. It should be appreciated that further (tertiary) saturated colors may be added to provide a full color wheel 10. The hue dimension is defined by the perimeter of the color wheel 10 representing the available hues H. On the other hand, the saturation dimension of the color wheel 10 is defined by the radial direction representing saturations S between 100% (perimeter) and 0% (center of color wheel 10). Clearly, the color wheel 10 provides a plurality of combinations of hue and saturation.

A different representation is displayed in FIG. 2B. Instead of a color wheel 10, a color triangle 11 is employed to visualize the color space. GB refers to green-blue. P represents purple. Again, the perimeter of the triangle 11 defines the fully saturated hues H, whereas the inbound direction defines the saturation S. Again, it is clear that the color triangle 11 provides a plurality of combinations of hue and saturation.

FIG. 2C depicts a well-known representation 12 of the color space, commonly referred to as the CIE representation. The perimeter again represents the hues H, whereas the inbound direction defines the saturation S. Again, it will be clear that the CIE representation 12 defines a plurality of hue/saturation combinations. Since artificial light from a light source 2 is not capable of covering the whole range of hues H and saturations S, in practice a limited area 13, often referred to as a gamut, is drawn to define the practically available combinations of hue and saturation. The shape and size of the gamut 13 is determined by the locations of the LEDs 3 in the CIE representation 12.

It should be appreciated that a third characteristic of light L, viz. the brightness, is not represented in either the color wheel 10, the color triangle 11 or CIE representation 12. The brightness or value of light L describes the overall intensity or strength of the light. The control device 1 may be capable of selecting a desired brightness, as will be explained with reference to FIGS. 3, 4A and 4B.

Figure 3:
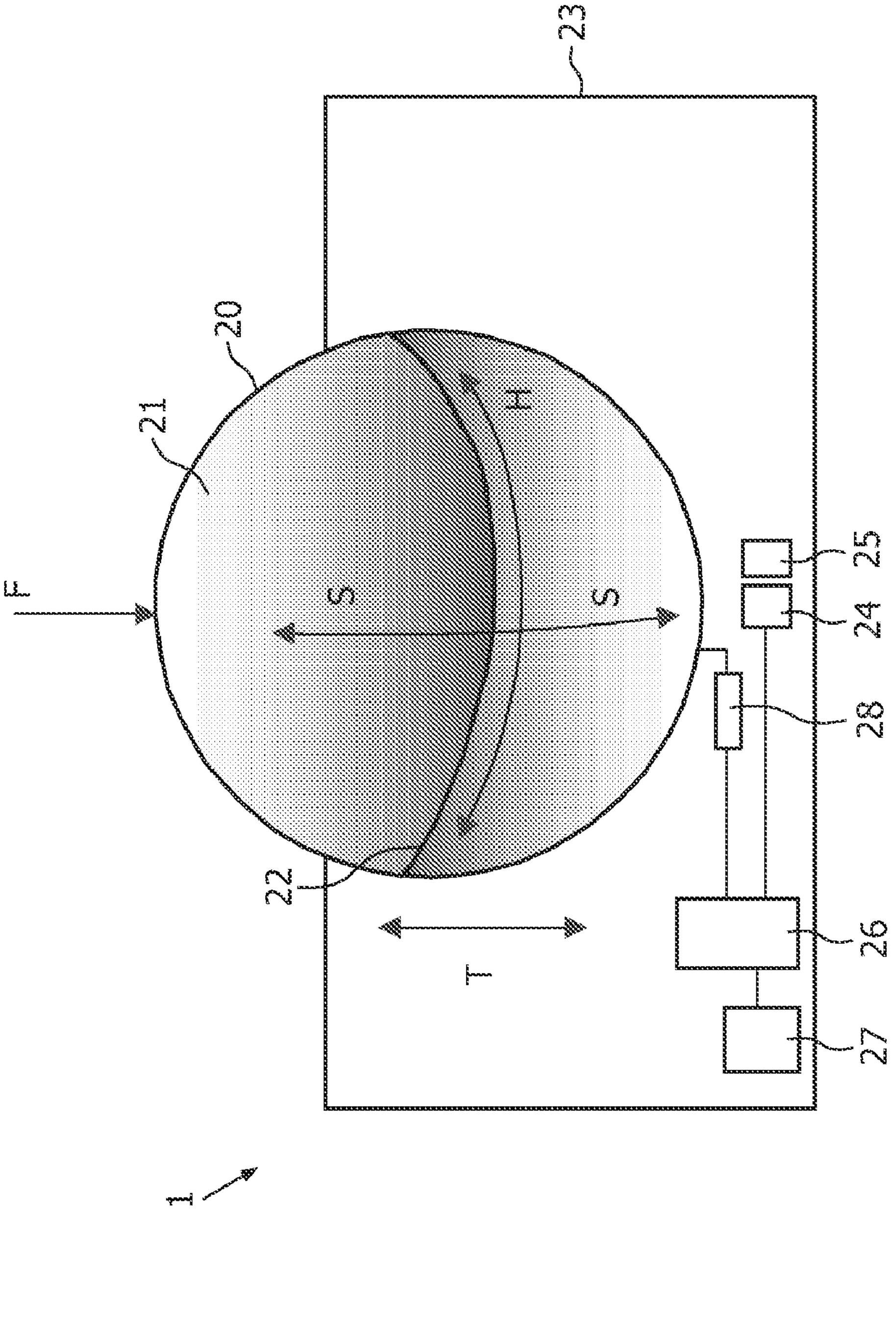
FIG. 3 schematically illustrates a control device according to a first embodiment of the invention.

FIG. 3 is a schematic illustration of a first preferred embodiment of the control device 1. The control device 1 comprises a spherical body 20 with a surface 21 on which a plurality of combinations of hue and saturation are printed. For example, the color wheel 10 of FIG. 2A may be provided on one half of the spherical body 20. It should be noted, however, that other representations of combinations of hue and saturation may be applied without departing from the scope of the present invention.

The color wheel 10 preferably only comprises those hues H and saturations S that are available for the light L of the light source 2, i.e. the displayed combinations of hue and saturation are dictated by the light emitting capability of the light source 2, in particular the light emitting capability of the LEDs 3.

Furthermore, in the present embodiment the color wheel 10 is printed twice on the spherical body 20. The boundary line 22 of the two color wheels 10 represents the pure colors, i.e. hues H with a saturation S of 100%. The perpendicular direction to the line 22 is the saturation dimension. Clearly, each saturation S is available twice on the surface 21, i.e. a particular saturation S is encountered on both sides of the boundary line 22. Consequently, the visual representation of the combinations of hue and saturation on the surface 21 has two mutually oppositely arranged white positions (saturation S=0%) on the north and south pole of the spherical body 20 as well as further mutually oppositely arranged corresponding saturations S for each hue H.

The spherical body 20 is rotatably carried in a housing 23 of the control device 1. A color sensor 24 is provided in the housing to determine which combination of hue and saturation is selected. A color sensor 24 is advantageous over a camera as such a sensor 24 does not require focusing with respect to the spherical body 20, more particularly to the surface 21. The color sensor 24 may be exposed to a particular area of the surface 21 and may determine an average of the combinations of hue and saturation to which the sensor 24 is exposed to provide a resulting combination of hue and saturation to be communicated to the light source 2.

The color sensor 24 is preferably arranged within the housing 23 such that no ambient light is received while a portion of the spherical body 20 is exposed to the color sensor 24. Consequently, a light source 25 is to be provided within the housing to enable the color sensor 24 to determine the combination of hue and saturation to which it is exposed. Preferably, the light source comprises one or more light emitting diodes. More preferably, the LEDs comprise a red, green and blue LED such that each exposed selection of hue and saturation can be optimally determined.

The sensor 24 may comprise or is communicatively connected to means 26 for generating at least one selection signal in response to the selection of a combination of hue and saturation on the surface 21, said selection signal comprising said selected hue and saturation. The selection signal is fed to a further means 27 for communicating said selection signal to the light source 2 to control said hue and saturation of the light L in accordance with the combination of hue and saturation determined by the sensor 24. It should be appreciated that signal processing and conversion may be applied as known in the art.

Finally, the control device 1 comprises a means 28 for detecting a translation T of the spherical body 20. This sensor may generate a brightness selection signal in response to a sensed translation. This brightness selection signal may be processed and transmitted to the light source 2 in order to control the brightness of the light L.

In operation, a user may operate the control device 1 by rotating the spherical body 20 provided with the plurality of visible combinations of hue and saturation by means of e.g. his finger. If the sensor 24 is positioned such that it is exposed to the south pole of the spherical body 20, a combination of hue and saturation may be selected by rotating the spherical body 20 such that the desired combination of hue and saturation is exposed to the user on the opposite side, i.e. the North Pole. Since the combinations of hue and saturation are printed symmetrically on the spherical body 20 as described above, the selected combination of hue and saturation on the north pole of the spherical body 20 corresponds to the combination of hue and saturation to which the sensor 24 is exposed. The light source 2 will consequently emit light L of the selected hue and saturation.

By applying a force F to the spherical body 20, the user makes the body 20 move towards the translation sensor 28. This translation T is detected by the sensor 28 and converted to a brightness selection signal for modifying the brightness B of the light L emitted by the light source 2.

An alternative embodiment of a control device 1 will be described with reference to FIGS. 4A and 4B.

The control device 1 has a body 20 comprising a surface 21 with a printed representation of combinations of hue and saturation that are available for the light L emitted from the light source 2. The surface 21 of the control device 1 shown in FIG. 4A comprises the printed color wheel 10 of FIG. 2A as a printed color space representation. The surface 21 of the control device 1 shown in FIG. 4B comprises a color triangle as a printed color space representation. As for the embodiment of FIG. 3, it should be appreciated that alternative visible representations of combinations of hue and saturation may be applied to the surface 21. The surface 21 is not necessarily circular or triangular. However, especially the triangular surface 21 of the control device 1 of FIG. 4B is suitable for visually representing the gamut 13 of the CIE representation 12 of the color space. Alternatively, the triangular surface 21 may represent the color triangle of FIG. 2B.

Figure 4B:
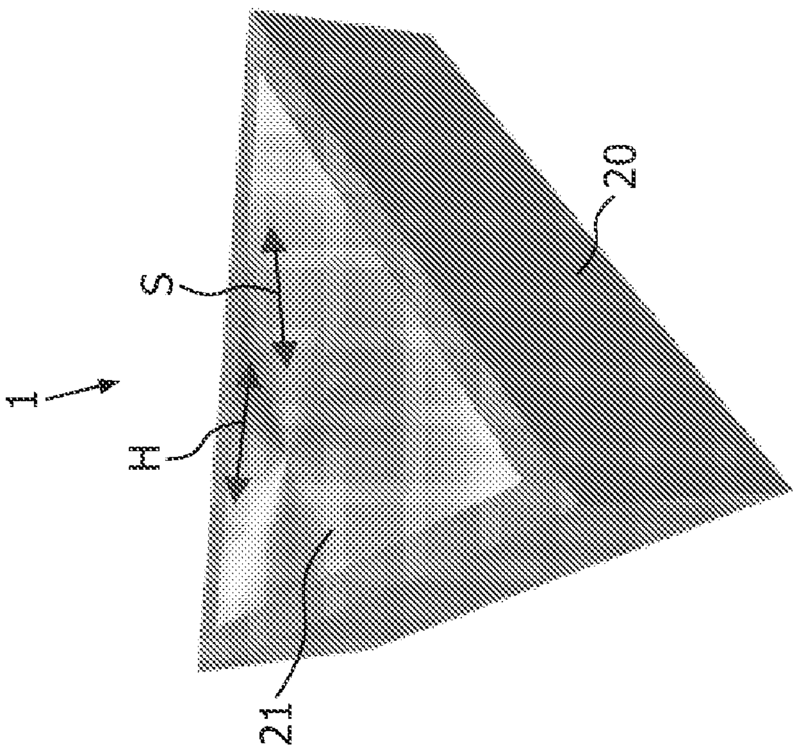
FIGS. 4A and 4B are schematic illustrations of a control device according to a second embodiment of the invention.
Figure 4A:
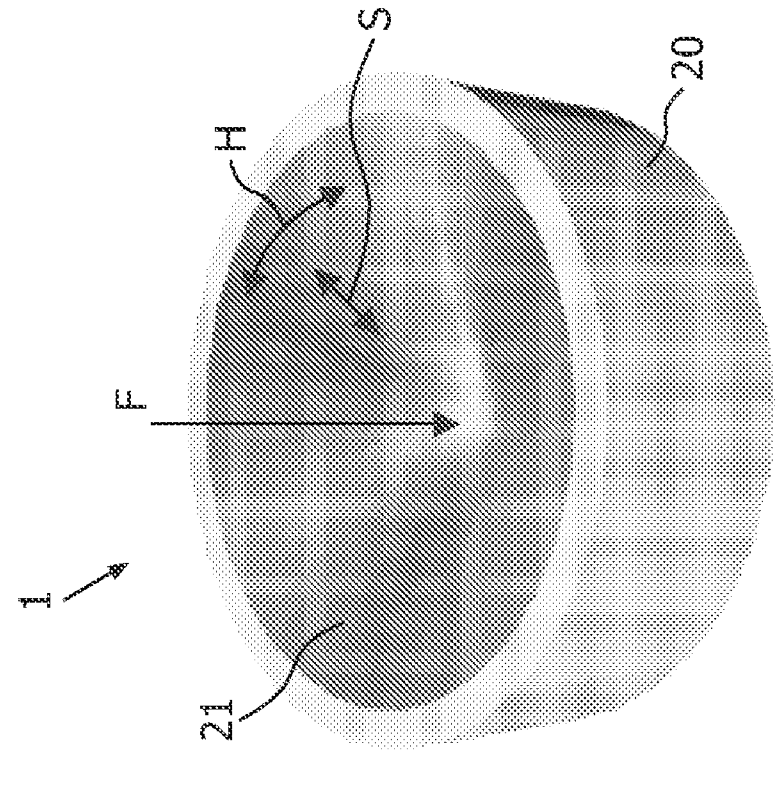

As for the control device of FIG. 3, the control device 1 of FIGS. 4A and 4B is capable of detecting a selection of a combination of hue and saturation represented on the surface 21. The selection of a desired combination of hue and saturation may be accomplished by e.g. a finger or a selection device of a user. The selection of a combination of hue and saturation may be detected by any means, including capacitive means which are well known in the art. Such capacitive means are capable of determining the location that has been touched by the user. The control device 1 of FIGS. 4A and 4B may e.g. have a stored look-up table that relates the determined location to a combination of hue and saturation corresponding to the combination of hue and saturation that is printed on that location of the surface 21. It should be noted that other means for relating the position selected on the surface 21 and the corresponding combination of hue and saturation fall within the scope of the present invention, including visual detection by means of e.g. a camera or by a pressure sensor.

The control device 1 of FIGS. 4A and 4B comprises a means 26 (not shown in FIGS. 4A and 4B) for generating at least one selection signal in response to the thus selected combination of hue and saturation on the surface 21, said selection signal comprising said selected hue H and saturation S. The selection signal is fed to a further means 27 (also not shown in FIGS. 4A and 4B) for communicating the selection signal to the light source 2 to control said hue and saturation of the light L in accordance with the combination of hue and saturation determined by the capacitive means and the look-up table.

The surface 21 of the control device 1 of FIGS. 4A and 4B is preferably deformable, i.e. the surface 21 has a pillow-like feel. This feature enables the control device 1 to control a further parameter of the light L emitted by the light source 2, most preferably the brightness of the light L, by manipulating a single surface 21. The application of a force F to a certain position on the surface 21 results in a selection of a combination of hue and saturation as described above as well as to a selection of the brightness of the emitted light L. The force F may be determined by a suitable sensor 28 (not shown). The deformable surface 21 provides tactile feedback to the user of the control device 1.

In operation, a user may operate the control device 1 of FIG. 4A or 4B by selecting, e.g. by touching with his finger, a particular combination of hue and saturation from a plurality of visible combinations of hue and saturation visualized on the surface 21, the light source 2 will consequently emit light L of the desired hue and saturation. The detection of the force F will as well set the desired brightness for the light L.

Figure 5:
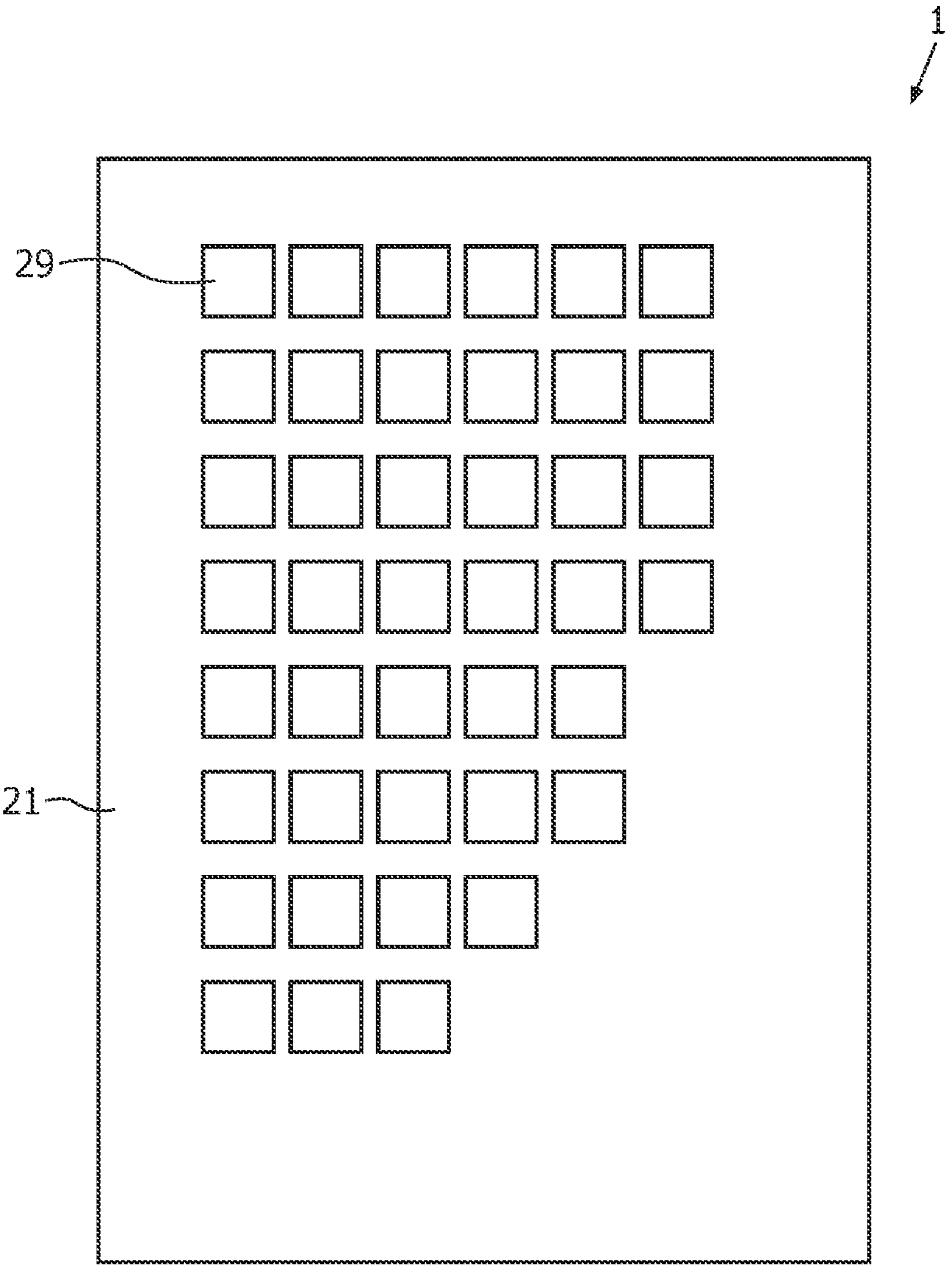
FIG. 5 shows an example of a surface for a control device according to a third embodiment of the invention.

From the above-described embodiments with respect to FIGS. 3, 4A and 4B it should not be inferred that the plurality of combinations of hue and saturation constitute a (quasi)-continuous series of hues and saturations, i.e. virtually all hues and saturations may be selected. It has already been mentioned that preferably only the combinations of hue and saturation that may be emitted by the light source 2 are represented on the surface 21. However, in an alternative embodiment as shown in FIG. 5, it may be the case that only a discrete number of combinations of hue and saturation may be selected from a representation on a surface 21, wherein e.g. the individual combinations may be selected from a corresponding number of sections 29 on the surface 21.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A control device for controlling hue and saturation of light emitted by a light source, said device comprising:

a housing, a substantially spherical body rotatably received in the housing and having a substantially contiguous surface containing a visible representation of a plurality of selectable combinations of hues and saturations available for said light source, a generator for generating at least one selection signal in response to a selection of a combination of a hue and a saturation on said surface, said selection signal comprising said selected hue and saturation, a communicator for communicating said selection signal to said light source to control said hue and saturation of said light in accordance with said selected combination of hue and saturation, and a sensor for determining said selected combination of hue and saturation, wherein said visual representation represents said hues in a first direction along said body surface and represents said saturations in a second direction along said body surface, and said at least one selection is selected by physically manipulating said body according to said first direction and said second direction.

2. The control device according to claim 1, wherein said control device is further capable of brightness control of said light, said device further comprising means for detecting manipulation of said body or surface which generates a brightness selection signal in response to said detected manipulation of said body.

3. The control device according to claim 1, wherein substantially each saturation is represented twice on mutually opposite positions on said spherical body.

4. The control device according to claim 1, wherein said spherical body has a hue selection trajectory defined along a perimeter of said body and a saturation selection trajectory defined along a partial further perimeter of said body substantially perpendicular to said hue selection trajectory.

5. The control device according to claim 1, wherein said sensor is accommodated within said housing and said device comprises a light source for illuminating a portion of said spherical body in said housing.

6. The control device according to claim 1, wherein said control device is further configured to control brightness of said light and wherein said housing comprises a sensor to determine translation of said spherical body and to generate a brightness selection signal in response to said sensed translation to control said brightness of said light.

7. The control device according to claim 1, wherein said visible representation is displayed as a circle.

8. The control device according to claim 1, wherein said visible representation is displayed as a triangle.

9. The control device according to claim 1, wherein said control device is further configured to control brightness of said light and wherein said surface comprises a deformable surface and said device contains a sensor capable of determining deformation of said surface and of generating a brightness selection signal in response to said sensed deformation to control said brightness of said light.

* * * * *